July 25, 1972 EIZO KANAI 3,679,389
METHOD AND APPARATUS FOR THE MANUFACTURE OF FLAT GLASS
Filed July 8, 1970 3 Sheets-Sheet 1

INVENTOR,
Eizo Kanai
BY: Kelman and Berman
AGENTS

INVENTOR,
Eizo Kanai
BY: Kelman and Berman

United States Patent Office 3,679,389
Patented July 25, 1972

3,679,389
METHOD AND APPARATUS FOR THE MANUFACTURE OF FLAT GLASS
Eizo Kanai, Yokohama, Japan, assignor to Asahi Glass Co., Ltd., Tokyo, Japan
Filed July 8, 1970, Ser. No. 53,072
Claims priority, application Japan, July 15, 1969,
44/55,429
Int. Cl. C03b 18/00
U.S. Cl. 65—99 A          9 Claims

ABSTRACT OF THE DISCLOSURE

An improved float process for the manufacture of flat glass in which a glass ribbon formed in a forehearth is fed onto a molten metal bath and both edges of the ribbon are maintained at temperatures lower than that of a central portion of the ribbon, whereby the glass ribbon advances without a substantial change in thickness and is smoothed in the course of the advance.

---

This invention relates to the manufacture of flat glass and, more particularly, to an improvement of the known float process and to apparatus for performing the method.

The molten metal bath used in the manufacture of flat glass by the known float process is composed of molten tin or a molten tin alloy which has a specific gravity greater than that of the glass, and is contained in an elongated tank or basin constructed of refractory material. The temperature of the metal is controlled to be higher at one longitudinal end of the tank than at the other.

To prevent oxidation of the molten metal, there is conventionally maintained a protective atmosphere, such as nitrogen containing a small amount of hydrogen, over the bath.

Molten glass is fed from a glass melting tank through a forehearth onto the metal bath at its hot end. The glass advances in contact with the bath to form a continuous ribbon which is smoothed or fire-polished. The glass ribbon is subsequently cooled and discharged from the cold end of the tank.

On the molten metal bath, the glass ribbon attains an equilibrium thickness as a result of the interplay of gravitational force and surface tension at about 850° to 1100° C. This equilibrium thickness is usually of the order of 6 to 7 millimeters.

For the manufacture of a glass ribbon of smaller than equilibrium thickness, traction is applied to the glass ribbon in the low-temperature zone of the bath.

In the manufacture of a glass ribbon of greater than equilibrium thickness, the lateral flow of the glass ribbon is restricted by parallel guides such as graphite bars adjacent both edges of the ribbon on the metal bath.

It is difficult to manufacture a glass ribbon less than about 3 millimeters thick by the known float process.

It is a principal object of this invention to provide a method and apparatus whereby a glass ribbon having a thickness other than the equilibrium thickness and, particularly, an extremely thin glass ribbon, may be manufactured more easily than by the conventional float process.

According to this invention both edges of the glass ribbon are maintained at a sufficiently low temperature to prevent a free lateral flow of the glass in the high-temperature zone of the metal bath so that the glass ribbon advances without substantial change in thickness throughout this zone.

In the practice of this invention, molten glass is continuously formed into a glass ribbon of predetermined thickness and width prior to entering the float tank by any of the conventional sheet glass forming processes such as the rolling process, Colburn process and the downward drawing process.

The molten metal bath is maintained at a temperature of about 1000° C. to about 1100° C. at the glass inlet (hot end), and at a temperature between about 600° C. and about 650° C. at the glass outlet (cold end). The glass ribbon on the hot end of the molten metal bath, while at about 850° C. to about 1100° C., is fluid enough to flow transversely, to vary its thickness toward the equilibrium thickness and, accordingly, to change its width as well.

In accordance with this invention both edges of the glass ribbon are maintained at a comparatively low temperature within the high-temperature zone of the bath. The central portion of the glass ribbon is maintained at about 850° C. to about 1100° C. and, preferably, about 900° C. to about 1050° C. in order to ensure a fire-polished surface.

The portions of the glass ribbon without about 10 cm. to about 40 cm. or sometimes more from either edge which are generally trimmed later are maintained at a sufficiently low temperature to prevent a lateral flow of the glass.

In the case of ordinary soda lime glass, this temperature is below about 850° C. and, preferably, about 650° C. to about 800° C.

Within the high temperature zone of the molten metal bath, the surface of the central portion is smoothed and the edge portions of the ribbon are sufficiently solidified to prevent lateral flow of the ribbon, so that the glass ribbon passes through the high-temperature zone without dimensional change. Within the low-temperature zone of the metal bath, the glass ribbon is too cold to change its dimensions.

To maintain the edges of the glass ribbon at a comparatively low temperature the portion of the bath adjacent said edges or the atmosphere immediately over said edges is maintained at a low temperature or cooled.

It is also beneficial to provide edge rollers or knurls which grip both edges of the glass ribbon in the high temperature zone, thereby not only applying a driving force to the glass ribbon but also preventing the ribbon from rolling, i.e. rocking in a transverse direction.

Figure 1:
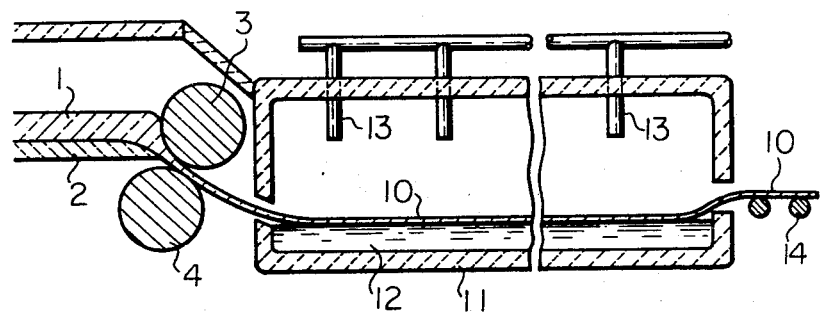
FIGS. 1, 2 and 3 show a tank for performing the method of this invention in cooperation with three devices for forming a glass ribbon, the views being in side-elevational section.

Referring to FIG. 1, molten glass 1 is fed from a forehearth 2 of a glass melting tank and continuously formed into a ribbon between a top roller 3 and a bottom roller 4. The glass ribbon 10 thus formed is then fed onto a molten metal bath 12 maintained in a tank 11.

The tank 11 has a cover through which feed pipes 13 supply nitrogen gas containing a small proportion of hydrogen gas. The gas forms a protective atmosphere in the headspace of the tank 11.

As the glass ribbon 10 advances along the molten metal bath 12, the surfaces in the central portion of the glass ribbon are smoothed and fire-polished. Then, the glass ribbon is gradually cooled, and finally discharged from a glass outlet at the rear end of the tank 11 by a conveyer roller 14.

Figure 2:
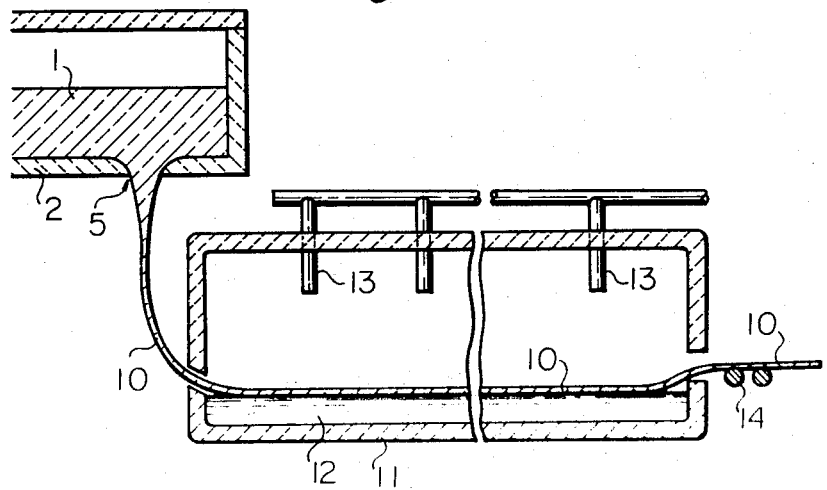

In FIG. 2, the glass ribbon is formed by the downward drawing process. Molten glass 1 flows down a slit 5 provided in the bottom of a forehearth 2 to form a glass ribbon 10 which is gradually bent until it enters the tank 11 in a substantially horizontal direction.

Figure 3:
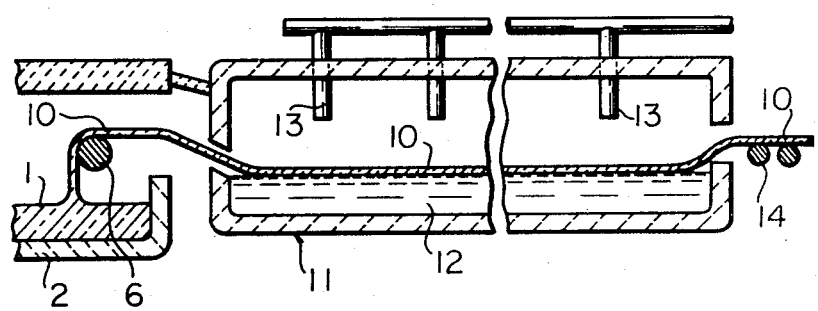

In FIG. 3, the glass ribbon 10 is formed by the Colburn process. In this method, molten glass 1 is vertically drawn up as a ribbon and bent by a roller 6 until it assumes a substantially horizontal position before it is fed onto the molten metal bath maintained in a tank 11.

In FIGS. 1, 2 and 3, the features of the tank 11, with which this invention is more particularly concerned, are not shown.

Figure 4:
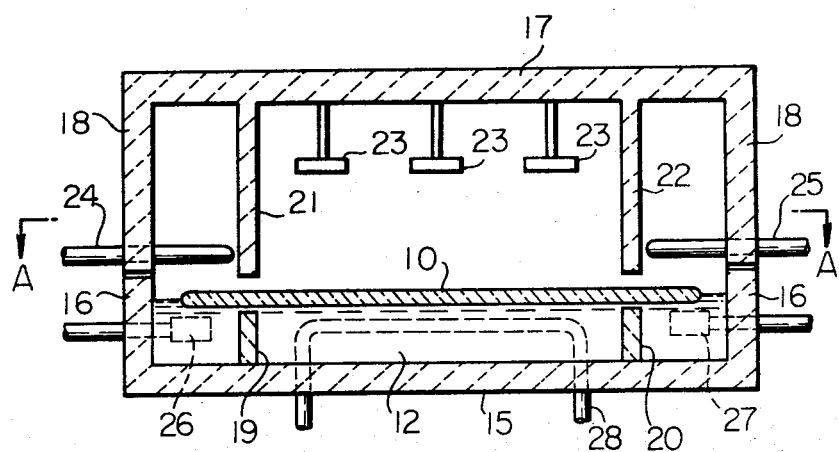
FIG. 4 illustrates the high-temperature zone of the tank of FIGS. 1 to 3 in front-elevational section.
Figure 5:
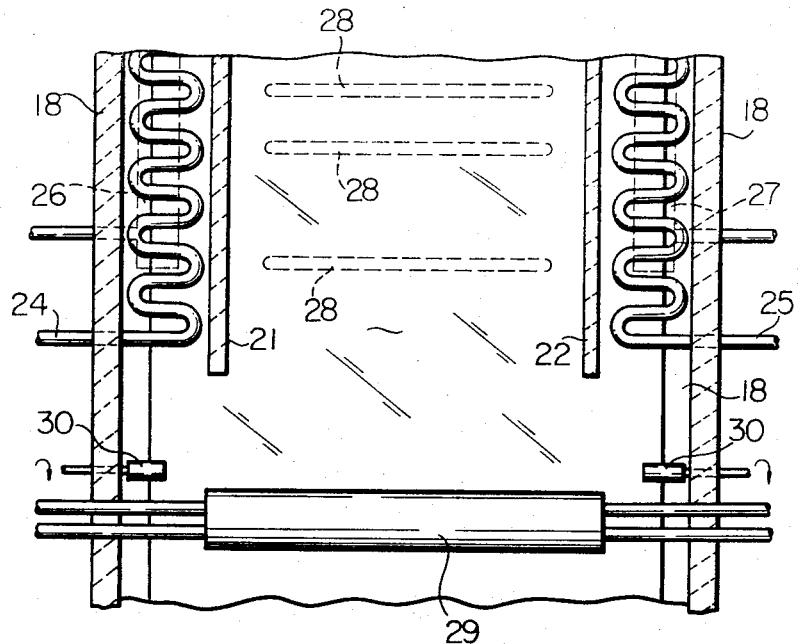
FIG. 5 is a fragmentary plan view taken on the line A—A of FIG. 4, showing the high-temperature zone together with part of the low-temperature zone of the tank.

Referring to FIGS. 4 and 5, from which the feed pipes 13 have been omitted, the tank 11 has a bottom 15 and side walls 16 which laterally confine the molten metal bath 12 and the glass ribbon 10, while the cover has a roof 17 and side walls 18. The bottom 15 carries longitudinal, lower partitioning walls 19 and 20, which are submerged in the metal bath. Extending downward from the roof 17 are upper partitioning walls 21 and 22 which extend longitudinally through the headspace over the bath in vertical alignment with the walls 19, 20.

The partitioning walls 21 and 22 divide the headspace into a central compartment and two side compartments, while the metal bath is divided by the walls 19 and 20 into a central bay and two side bays.

In the central compartment of the headspace, there are provided electrical heating elements 23, while a submerged heater 28 is installed in the central bay of the bath. In the side compartments of the headspace, there are provided cooling water pipes 24 and 25 adjacent the corresponding edges of the glass ribbon 10, while cooling water boxes 26 and 27 are submerged in the side bays of the metal bath (see FIG. 5).

In this manner, during its advance through the high temperature zone of the metal bath, the glass ribbon 10 is protected against spontaneous changes in width and thickness and both sides of the central portion of the ribbon are sufficiently fire-polished.

The glass ribbon 10 which has passed through the high-temperature zone of the metal bath has a temperature of about 800° to 850° C., and is gradually cooled by a cooling-water box 29 (FIG. 5) to a final temperature of about 600° C. at the glass exit end of the tank.

Adjacent the edges of the glass ribbon 10, there are provided edge rollers 30, which are driven in frictional contact with the corresponding edges to apply driving forces to the glass ribbon. These rollers may be installed in the high-temperature zone of the tank.

Figure 6:
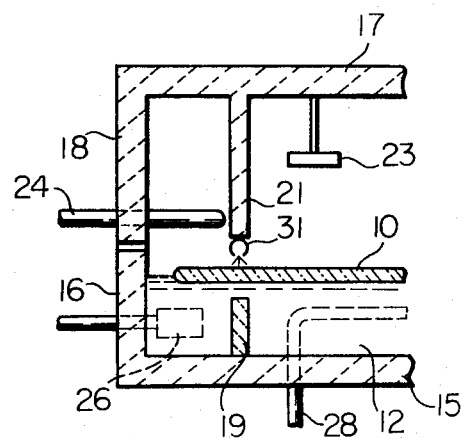
FIG. 6 is a fragmentary view of a modification of the tank of FIG. 4.

In operating the illustrated apparatus, the glass ribbon is maintained at a temperature of about 800° to 900° C. at the inlet end of the tank. The molten metal bath is maintained at a temperature of about 1000° to 1050° C. in the central bay in the neighborhood of the inlet end of the tank and at about 700° to 800° C. in the side bays. As the glass ribbon advances, the temperature of the bath drops by degrees and, at the downstream end of the tank, it is maintained at a transversely uniform temperature of about 700° C. In the modified tank illustrated in FIG. 6, not otherwise different from FIG. 4, a slotted pipe 31 is disposed along the lower edge of the upper partitioning wall 21, and a portion of the gas forming the protective atmosphere, is discharged downward through the slits in the pipe 31. The atmosphere in the central compartment of the headspace is completely contained by this gas curtain, and the side compartments can be easily maintained at a comparatively low temperature.

This invention is applicable to the manufacture of glass products greater in thickness than the equilibrium thickness, e.g. from 10 to 15 millimeters, but the merits of the invention are most apparent in the manufacture of glass sheets 1 to 2 millimeters thick.

I claim:

1. In a method of manufacturing glass in which a continuous, elongated ribbon of molten glass of predetermined width and thickness is formed, the formed ribbon is moved along the surface of a body of molten metal from one terminal portion of said body to another terminal portion of the same, and the temperature of said body decreases in the direction of ribbon movement to substantially solidify the glass in the moving ribbon, and withdrawing said ribbon as a sheet of substantially solid glass from said other terminal portion, the improvement which comprises:

(a) maintaining a central portion of said ribbon while in contact with the surface of said one terminal portion at a first temperature sufficient to smooth the surface of said central portion;

(b) maintaining the two edge portions of said ribbon longitudinally coextensive with said central portion at a second temperature sufficiently lower than said first temperature to prevent spontaneous lateral flow of the glass in said ribbon, whereby said central portion is laterally confined between said edge portions; and (c) substantially maintaining said predetermined thickness of said glass in said central portion until said sheet is withdrawn from said second terminal portion.

2. In a method as set forth in claim 1, said glass being a soda-lime glass, said first temperature being 850° to 1100° C., and said second temperature being 650° to 800° C.

3. In a method as set forth in claim 1, said predetermined thickness being less than 3 millimeters.

4. In a method as set forth in claim 1, the temperature of said first terminal portion being 1000° to 1100° C. and the temperature of said second terminal portion being 600° to 650° C.

5. In a method as set forth in claim 1, said first temperature being 850° to 1100° C.

6. In a method as set forth in claim 1, said first temperature being 900° to 1050° C., and said second temperature being 650° to 800° C.

7. In an apparatus for manufacturing flat glass including means for converting molten glass into a continuous, elongated ribbon, a tank, a body of molten metal in said tank, the tank having an inlet end and an exit end, and moving means for longitudinally moving said ribbon through said tank from said inlet end to said exit end while floating on said body of metal, the improvement which comprises:

(a) two spaced partitioning means extending in said tank in a direction from said inlet end toward said exit end and separating a central bay in said tank from respective side bays, said partitioning means being submerged in said molten metal; and (b) means for maintaining said molten metal in said central bay at a first temperature sufficient to cause fire-polishing of said ribbon, and for maintaining said molten metal in each of said side bays at a second temperature lower than said first temperature.

8. In an apparatus as set forth in claim 7, a cover on said tank bounding a headspace above said body, means for maintaining a gaseous atmosphere in said headspace, and partitioning means on said cover defining a central compartment of said headspace substantially vertically aligned with said central bay and two side compartments substantially vertically aligned with said side bays, and means for holding the temperature of said gaseous atmosphere in said side compartments below the temperature of said atmosphere in said central compartment.

9. In an apparatus as set forth in claim 8, each of said partitioning means including a wall member elongated in the direction of ribbon movement and having a longitudinal edge portion spacedly adjacent the surface of said body, and means for downwardly discharging a gas curtain from the edge portion of one of the wall members on said cover toward said body of molten metal.

References Cited

UNITED STATES PATENTS

| 3,301,651 | 1/1967 | Long | 65—99 A X |
| 3,432,285 | 3/1969 | Gulotta | 65—182 R X |
| 3,337,318 | 8/1967 | Gulotta | 65—99 A X |

ROBERT L. LINDSAY, JR., Primary Examiner

U.S. Cl. X.R.

65—182 R, 199, 356